(No Model.) 4 Sheets—Sheet 1.
N. H. RICHARDS.
GRIP AND BRAKE GEAR OF CABLE TRAM CARS.
No. 387,920. Patented Aug. 14, 1888.
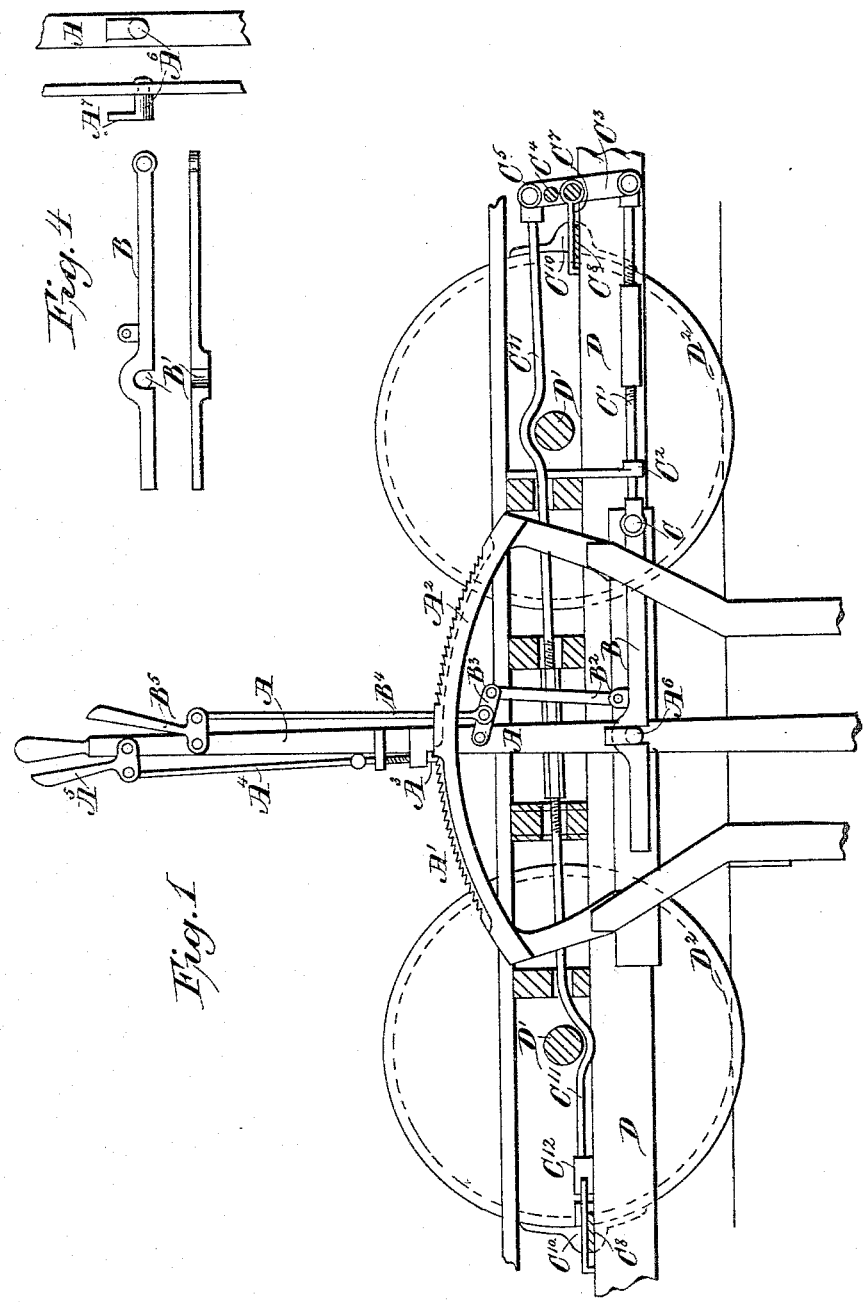

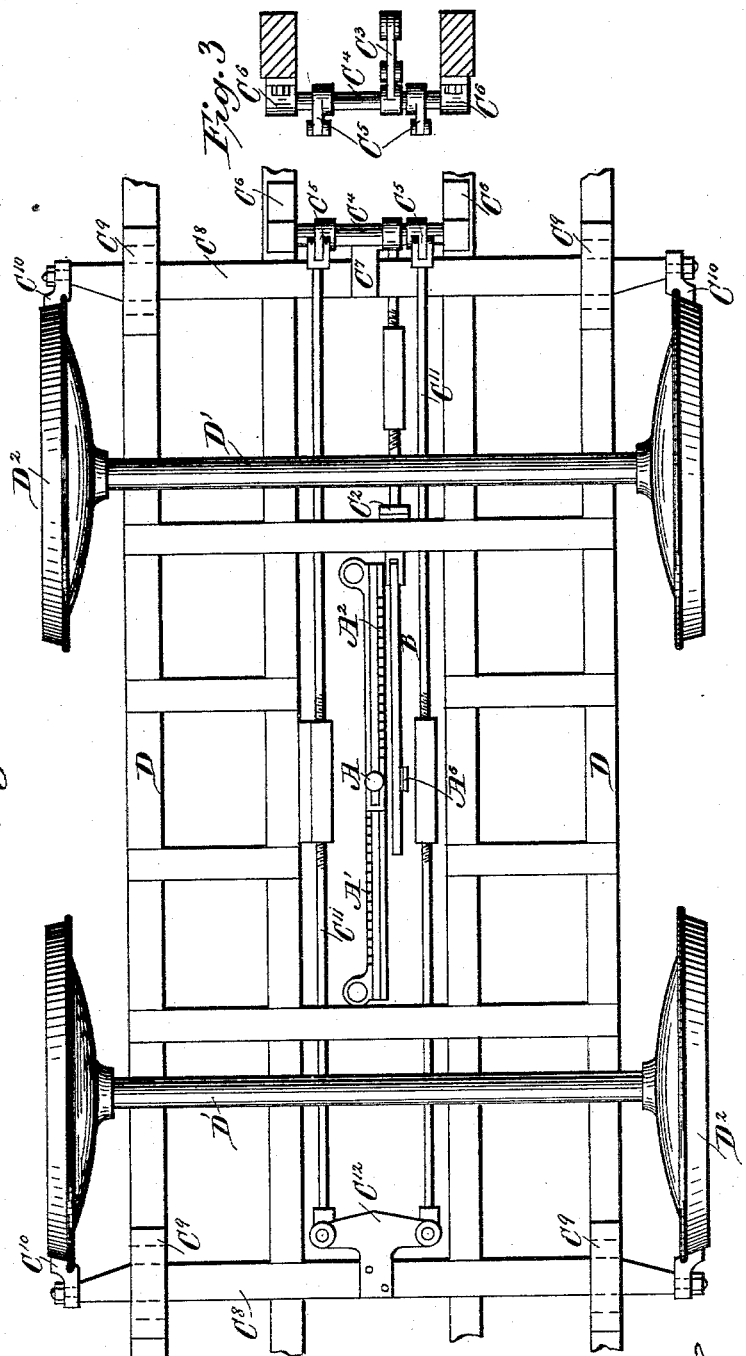

(No Model.) 4 Sheets—Sheet 3.
N. H. RICHARDS.
GRIP AND BRAKE GEAR OF CABLE TRAM CARS.
No. 387,920. Patented Aug. 14, 1888.
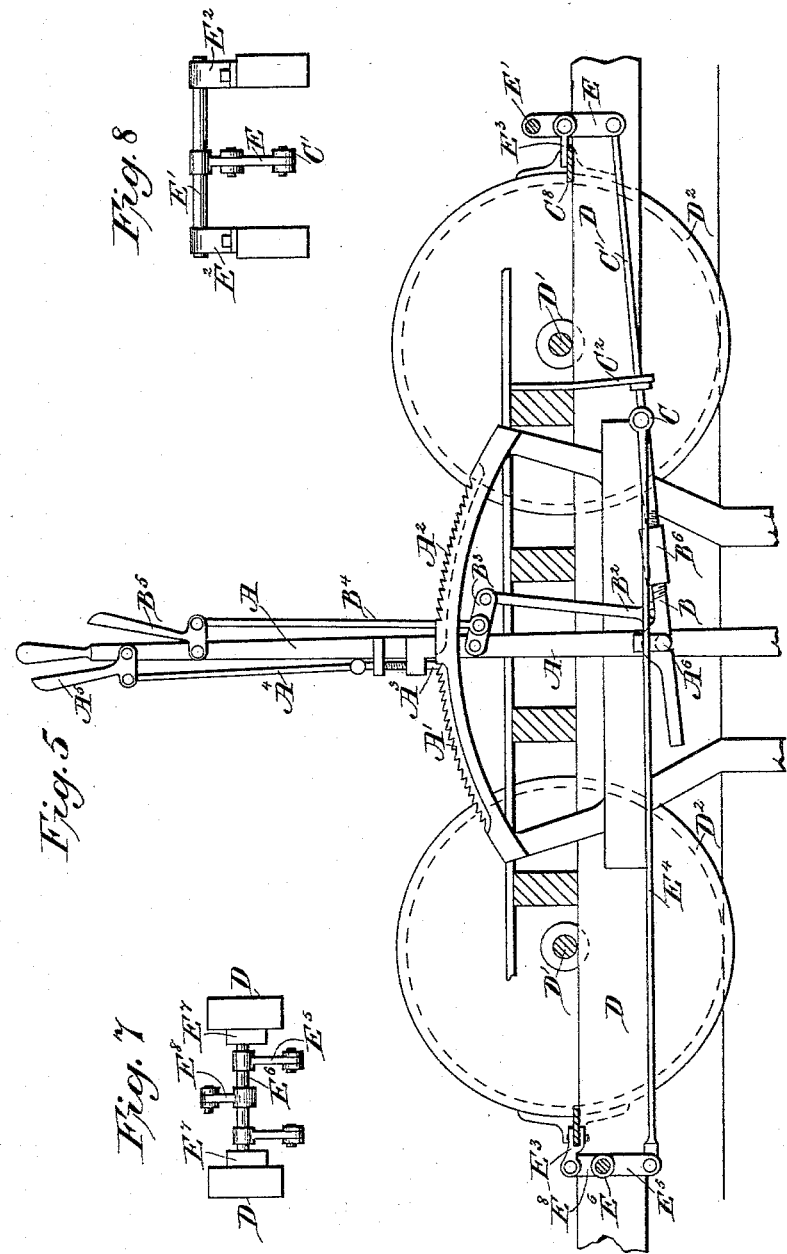

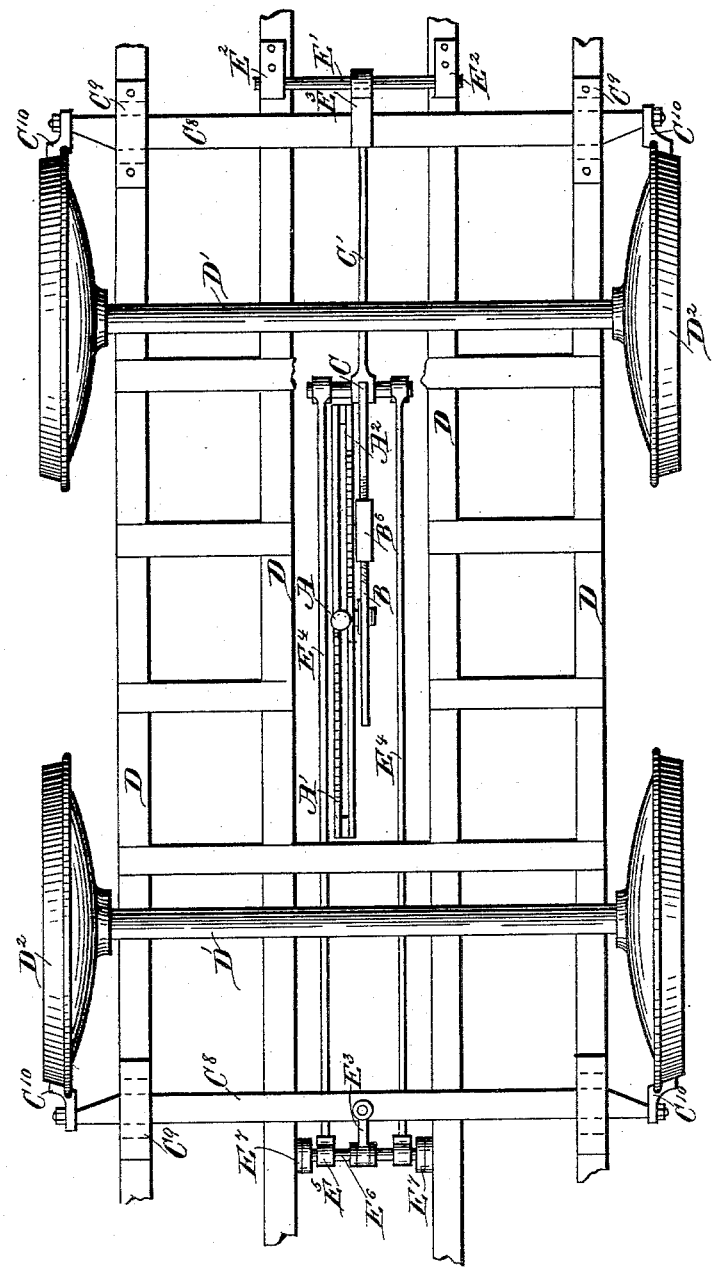

UNITED STATES PATENT OFFICE.

NOWELL HENRY RICHARDS, OF RICHMOND, ASSIGNOR OF ONE-THIRD TO GEORGE WILLIAM SELBY, JR., OF MELBOURNE, VICTORIA.

GRIP AND BRAKE GEAR OF CABLE TRAM-CARS.

SPECIFICATION forming part of Letters Patent No. 387,920, dated August 14, 1888.

Application filed December 8, 1887. Serial No. 257,342. (No model.) Patented in Victoria February 17, 1887, No. 4,935; in Tasmania October 20, 1887, No. 503/9; in New South Wales October 21, 1887, No. 280; in South Australia October 21, 1887, No. 883; in New Zealand October 26, 1887, No. 2,603; in England November 26, 1887, No. 16,295, and in Queensland February 6, 1888, No. 345.

*To all whom it may concern:*

Be it known that I, NOWELL HENRY RICHARDS, a subject of the Queen of Great Britain, residing at Richmond, in the British colony of Victoria, engineer, have invented new and useful Improvements in the Grip and Brake Gear of Cable Tram-Cars, (for which I have obtained Letters Patent in the following countries, to wit: in Victoria, dated February 17, 1887, No. 4,935; in Tasmania dated October 20, 1887, No. 503/9; in New Zealand, dated October 26, 1887, No. 2,603; in New South Wales, dated October 21, 1887, No. 280; in Queensland, dated February 6, 1888, No. 345; in South Australia, dated October 21, 1887, No. 883, and in Great Britain, dated November 26, 1887, No. 16,295, and for which I, in conjunction with Charles Llewellyn Watt, a subject of the Queen of Great Britain, residing at Balaklava, near Melbourne, in the British colony of Victoria aforesaid, filed an application for Letters Patent in the said British colony of Victoria on the 17th day of February, 1887, No. 4,935; that under the laws governing the grant of patents in said colony the Letters Patent will bear date as of the day of filing, and that up to the present time the patent on said application filed in said colony has not been granted,) of which the following is a specification.

This invention of improvements in the grip and brake gear of cable tram-cars relates, mainly, to the mechanism which enables the one hand-lever to be used for operating the gripping devices and the brake mechanism, and the essence of it lies in connecting the brake-gear, through the medium of a gap-bar, with a pin fixed at the side of the hand-lever. The object of the gap-bar is to allow of its being raised off the lever-pin and so to disconnect the brake-gear from the lever, and thus enable the gripping-jaws to release their hold of the rope while the car is traveling. When the lever and gap-bar are in their normal connected position, with the gap of the bar on the side pin, then if the lever is placed so as to apply the brakes to the wheels the gripping devices release their hold of the rope, and, vice versa, when the lever is placed to release the brakes the gripping devices grip the rope. It is thus evident that it is impossible under any circumstances to apply the brakes while the rope is gripped or to grip the rope while the brakes are on. I show my gap-bar connected to two forms of the brake-gear in order to better exemplify my invention.

Referring to my drawings, throughout which similar letters indicate corresponding parts, Figure 1 is a side sectional view of sufficient of the grip and brake mechanism carried on a "dummy-car" to exhibit my invention attached to one form of brake-gear for acting on the wheels. Fig. 2 is a plan of the mechanism and parts shown in Fig. 1. Fig. 3 shows a view of the end weigh-shaft and its attachments. Fig. 4 shows details of the stud or pin at the side of the operating hand-lever and the gap-bar. Fig. 5 is a side sectional view, and Fig. 6 a plan, of an alternative arrangement of the brake mechanism carried on the dummy-car and connected according to my invention to the operating hand-lever. Fig. 7 is a view of the weigh-shaft and its connections at the one end, and Fig. 8 a view of the weigh-shaft and its connections at the other end of the brake-gear. (Shown in Figs. 5 and 6.)

In Figs. 1 to 4, A is the operating hand-lever, which is connected at its lower end to the rope-gripping mechanism, and this lever is arranged between two quadrant-bars, one of which has ratchet-teeth formed on it at A' and the other has ratchet-teeth on it in the reverse direction at A².

A³ is a spring catch-piece arranged at one edge of lever A, and this catch-piece is beveled at its one edge to suit the teeth A' and at its other edge to suit the teeth A², while its upper end is connected by rod A⁴ with the tongue-lever A⁵, which is centered to said lever A.

A⁶ is a pin or stud arranged at one side of the lever A and at a point as near as possible to the top of the slot-beam of the tram-track, and this pin has an upstanding ear, A⁷, at its outer edge.

B is a gap-bar, the gap B' of which is made to fit over the pin or stud A⁶, and this gap-bar has an upper snug on it, which is connected by the link B² with the lever B³, which is centered to the lever A. The lever B³ is connected by the rod B⁴ with another tongue-lever, $B^5$, also centered on said hand-lever A. The back end of the gap-bar B is jointed at C to the brake-gear, which consists of an adjustable rod, $C'$, supported at its one end in the guide-bracket $C^2$, and having its other end connected to the crank-arm $C^3$, projecting down from the weigh-shaft $C^4$, which has projecting upward from it two shorter arms, $C^5$. This shaft is supported in suitable bearings, $C^6$. The arm $C^3$ has a link, $C^7$, attached to it, which is connected to the transverse bar $C^8$ at its end of the car, and such bar is supported in the guides $C^9$, and has at each of its ends a brake-plate, $C^{10}$, which bears upon the tread and flange of the wheel. The short arms $C^5$ are connected to the adjustable longitudinal rods $C^{11}$, the other ends of which are connected to the cross-head $C^{12}$, which is attached to another transverse bar, $C^8$, at the other end of the car, such bar being also supported in guides $C^9$ and having brake-plates $C^{10}$ at its ends. D is the frame of the car, $D'$ its axles, and $D^2$ its wheels.

In Figs. 5 to 8 is shown the alternative construction of brake mechanism for acting on the car-wheels, which is operated, as described for the first description of brake-gear, by the lever A, through the intervention of the gap-bar B, which, for this form of brake mechanism, is made in two pieces joined together by the screw-coupling $B^6$. The back end of the bar is jointed, as before, at C to a rod, $C'$, supported in a guide-bracket, $C^2$, while the outer end of rod $C'$ is jointed to the lower end of an arm, E, centered on a weigh-shaft, $E'$, supported in bearings $E^2$ on the frame D. A link, $E^3$, is also jointed, as shown, to the arm E, and this link is secured to the transverse bar $C^8$, which, as before, is furnished with the brake-plates $C^{10}$, and is supported in the guides $C^9$. At the joint C a cross-bar is carried, which supports the inner centers of two connecting-rods, $E^4$, the other ends of which are connected to arms $E^5$, projecting downward from the weigh-shaft $E^6$, supported in bearings $E^7$, attached to the frame D, and this weigh-shaft has an upwardly-extending arm, $E^8$, at its center, which is connected by the link $E^3$ to the transverse brake-bar $C^8$, as before. By arranging a screw-coupling, $B^6$, on the gap-bar the centers of the rods acting on the brake-plates at both ends of the vehicle are simultaneously adjusted.

The mode of operation is as follows: Supposing a tram-car is fitted up according to my invention, then if the gap $B'$ in the bar B be down on the pin or stud $A^6$ at the side of the lever A, and it be pulled over toward the left-hand side, then the brakes would be applied to the wheels and the gripping-jaws would release their hold of the rope; and, vice versa, when the lever is pushed forward again toward the right-hand side the brakes would be released and the grip applied to the rope. At positions where the rope is depressed, and it has to be released without applying the brake to the wheels, then (to allow of such being done) the disengaging-handle is pressed inward toward the lever A, so as to raise the gap-lever above and clear of the pin or stud $A^6$ on the lever A, and thus leave the hand-lever free to be drawn to the left-hand side, and so allow the gripping-jaws to release their hold of the rope without the brakes being applied. When it is desired to secure the hand-lever at any position, the catch $A^3$ is allowed to engage with the ratchet-teeth of the quadrant-bars.

Having thus described the nature of my said invention and the manner of performing the same, I would have it understood that what I believe to be new, and therefore claim as my improvements in the grip and brake gear of cable tram-cars, is—

1. The combination, with the gripper hand-lever, of a pin or stud which is arranged at its side, and a gap-bar, which is attached to the wheel-brake mechanism, substantially as herein described and explained, and as illustrated in my drawings.

2. The combination, with the gripper hand-lever having a pin or stud at its side and the gap-bar which engages with it, of the tongue-lever, the connections of which are attached to the gap-bar to raise it clear of the stud when so desired, substantially as herein described and explained, and as illustrated in my drawings.

3. The combination, substantially as herein described and shown, with the gripper hand-lever provided with a pin or stud projecting from one side thereof, of a gap-bar, adjustable as to length, connected with the wheel-brake mechanism, for the purposes specified.

4. The combination, substantially as herein described and shown, with the gripper hand-lever provided with a stud or pin projecting from one side thereof, of a gap-bar resting on the stud, a connection between said bar and the gripper-lever, whereby the bar may be lifted off the stud, a connection between the bar and the brake mechanism at one end of the car, a cross-bar connected with the gap-bar, and connecting-rods for connecting said cross-bar with the brake mechanism at the other end of the car, as shown, and for the purposes specified.

5. The combination, substantially as herein described and shown, with the gripper hand-lever provided with a stud or pin projecting from one side thereof, of a gap-bar resting on the stud and adjustable as to length, a connection between the gap-bar and hand-lever, whereby said bar may be lifted off the stud, a connection between the bar and brake mechanism at one end of the car, a cross-bar connected with the gap-bar, and connecting-rods connecting said cross-bar with the brake mechanism at the other end of the car, for the purposes specified.

NOWELL HENRY RICHARDS.

Witnesses:
WALTER S. BAYSTON,
WALTER CHARLES HART.